US012180053B1

(12) United States Patent
Dunlap

(10) Patent No.: US 12,180,053 B1
(45) Date of Patent: Dec. 31, 2024

(54) SEPTUM-AND-BODKIN KIT FOR RESEALING A PARTIALLY DEPLETED BOTTLE OF WINE

(71) Applicant: Mervle Lynn Dunlap, Boise, ID (US)

(72) Inventor: Mervle Lynn Dunlap, Boise, ID (US)

( * ) Notice: Subject to any disclaimer, the term of this patent is extended or adjusted under 35 U.S.C. 154(b) by 0 days.

(21) Appl. No.: 18/888,067

(22) Filed: Sep. 17, 2024

(51) Int. Cl.
*B67B 1/00* (2006.01)
*B67B 1/04* (2006.01)

(52) U.S. Cl.
CPC .................................... *B67B 1/045* (2013.01)

(58) Field of Classification Search
CPC ......... B65D 81/245; B67B 1/045; B67B 1/10; B67B 1/00
USPC .................. 53/310, 319; 220/216, 217, 222; 215/231
See application file for complete search history.

(56) References Cited

U.S. PATENT DOCUMENTS 3,987,941 A * 10/1976 Blessing ............. A47J 31/4407 426/115
4,723,674 A * 2/1988 Nunes .................... B65D 39/02 220/580
8,365,931 B2 * 2/2013 Rees .................... B65D 81/245 215/231
2003/0102311 A1 * 6/2003 Brady .................. B65D 81/245 215/231
2008/0110847 A1 * 5/2008 Rees .................... B65D 81/245 215/264
2011/0185922 A1 * 8/2011 Rees .................... B65D 81/245 99/645

FOREIGN PATENT DOCUMENTS

JP 2012126459 A * 7/2012
WO WO-2017082383 A1 * 5/2017 ............. B65D 39/02

* cited by examiner

*Primary Examiner* — Andrew M Tecco
(74) *Attorney, Agent, or Firm* — Burdick Patents, P.A.; Sean D. Burdick; Colin L. Honan

(57) ABSTRACT

A kit consisting of a septum and bodkin is provided for resealing liquid such as wine within a bottle having a neck and body. The septum, a resiliently deformable diaphragm, has an undeformed dimension substantially equal to an inner diameter of the body and is deformable to a dimension less than an inner diameter of the neck. The bodkin, an elongated rod, has a ramming end to deform and push the septum through the neck, and opposite the ramming end has a retrieving end to grasp and extrude the septum from the neck. Using the bodkin, the septum is placed against the surface of liquid and inner wall of the bottle to form an air-tight seal that can be broken using the bodkin or by rotating the bottle to a breakage angle. The septum can be extruded from the bottle using the retrieving end of the bodkin.

19 Claims, 4 Drawing Sheets

SEPTUM-AND-BODKIN KIT FOR RESEALING A PARTIALLY DEPLETED BOTTLE OF WINE

BACKGROUND OF THE INVENTION

Field of the Invention

The present invention relates generally to devices for sealing liquid contained in a bottle, and more specifically to a kit for resealing a partially depleted bottle of wine.

Description of Related Art

Wine bottles are typically sealed with a cork, with a threaded cap, with a wax, metal or plastic seal, or with some combination of these materials. Ideally, all the wine within the bottle should be enjoyed soon after the bottle is uncorked. All too often, however, a good portion of the wine is left over and the bottle is recorked to preserve its contents for another day. For the untrained consumer, red wine will typically remain palatable for up to five days—that is, if the bottle is stored in a cool dark place and recorked. Generally, the lighter the red wine, the shorter its shelf life after opening.

Most wines will spoil within a few days of opening. True sommeliers, however, will insist that the taste of a fine wine is discernably altered after the bottle has been open for more than a single day. The alteration in taste is caused by oxidation made possible by exposure of the wine to ambient air. Oxidation of the wine will gradually turn acetaldehyde into acetic acid, leading to discoloration and conversion of the wine to vinegar. Even if a partially depleted wine bottle is recorked, air in sufficient quantity to cause oxidation has already entered the bottle to react with the remaining wine and begin spoilage.

One solution to the problem of preserving an opened bottle of wine takes the form of a specialized tool manufactured by Coravin, Inc. of Bedford, Massachusetts. The Coravin® tool is a hand-held device that uses a clamp to drive an elongated hollow needle through the cork of a wine bottle to allow wine to be poured out through the needle. The device includes a small canister of compressed Argon gas that is configured to replace the extracted wine with an equivalent volume of the gas, and prevent air from accumulating within the bottle. The hollow needle is designed not to destroy the integrity of the cork, so that when the needle is removed, the cork reseals itself and prevents air from entering the wine bottle. Drawbacks of this solution include the high cost of the tool (currently about $150), the cost of replacement gas cylinders, and the need to store, maintain, and periodically clean the specialized tool.

A more elegant and inexpensive means is needed for resealing a wine bottle to preserve the flavor and quality of leftover wine.

SUMMARY OF THE INVENTION

To solve the aforesaid problems, the present invention provides a system that allows a partially depleted bottle of liquid to be resealed after the bottle has been opened and a portion of its liquid content has been dispensed. The invention is a kit that consists of two main parts—a septum specially designed for making an air-tight seal within the bottle, and a bodkin specially designed for manual insertion, placement, and withdrawal of the septum into, within, and from the bottle.

In one embodiment, the invention is a kit for resealing liquid contained within a bottle of the type having a neck and a body, such as a standard wine bottle. The kit includes a septum and a bodkin. The septum is resilient and deformable, and has an undeformed dimension that is substantially equal to an inner diameter of the body of the bottle. The septum is deformable to a deformed dimension that is less than an inner diameter of the bottle neck. The bodkin has a ramming end configured to deform and push the septum through the neck, and has opposite the ramming end a retrieving end configured to grasp and extrude the septum from the neck. The septum, when placed within the body of the bottle, will assume its undeformed shape capable of forming an air-tight seal against the inner diameter of the body. The ramming end of the bodkin is used to make fine adjustments to the placement and position of the septum atop the surface of the contained liquid to ensure an effective seal.

In different embodiments, the air-tight seal formed by the septum varies in strength. The septum may be configured to maintained the seal when the bottle is inverted 180 degrees. In other embodiments, the septum may be configured to break the seal at any point along a range of breakage angles between about 90 degrees and about 180 degrees off of horizontal, when the bottle is partially full and rotated according to a normal human pouring motion.

Other embodiments include particular structural features on the septum or bodkin. In one such embodiment, the septum includes a circular disk having a perimeter in the form of a flexible ring that has greater rigidity than that of the circular disk. In another, the retrieving end of the bodkin is specially dimensioned to engage an edge of the septum. In another, the ramming end of the bodkin is blunt, and may be shaped as round, spherical, cylindrical, or other geometry so long as the ramming end has a width less than the inner diameter of the bottle neck. In another variation, the receiving end of the bodkin may include a single barbed or barbless hook, or may have a pair of opposing barbed or barbless hooks separated by a gap having a width greater than a thickness of the septum. In another variation, the bodkin may be an elongated rod having multiple removably coupleable sections or telescoping sections. In yet another variation, one or both of the ramming end and the receiving end may be removably attachable to one of the coupleable sections.

In any of the aforesaid embodiments, the bodkin is formed from a rigid material, preferably stainless steel, and the septum is formed from a resiliently deformable elastomer such as synthetic or foam rubber. And in any embodiment, the outer diameter of the septum may be substantially equal to an inner diameter of an industry standard wine bottle, and the length of the bodkin may be extendable to at least half the height of the same standard bottle.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. Dimensions shown are exemplary only. In the drawings, like reference numerals may designate like parts throughout the different views, wherein:

DETAILED DESCRIPTION OF THE INVENTION

The following disclosure presents exemplary embodiments for a kit designed to reseal a partially depleted bottle containing liquid. In particular, the kit is designed to provide a simple and economical solution to preserving wine contained within a partially depleted wine bottle to prevent or significantly reduce oxidation of the remaining wine. The kit includes two separate components that cooperate to form a removable seal at or slightly above the liquid level within the bottle. The seal is maintained so long as the wine bottle is stored in an upright position and can preserve the contained liquid for an extended period of time after the initial bottle opening.

FIGS. 1 through 5 illustrate various embodiments of the individual components that make up the kit for resealing partially depleted bottles containing liquid according to the present invention. The kit 100 includes a septum 10 (FIGS. 1-3) and a bodkin 20 (FIGS. 4-5) that are used together to provide an air-tight, or substantially air-tight seal within a partially depleted bottle, such as a wine bottle. References hereafter to an air-tight seal include a substantially air-tight seal which may leak an infinitesimal and inconsequential amount of air molecules, but effectively prevents leakage of liquid past the seal. Each of the FIGS. 1 to 5 will be described in the following paragraphs and it should be understood that reference throughout this disclosure to the kit 100 refers to any combination of any septum disclosed herein with any bodkin disclosed herein.

Figure 1:
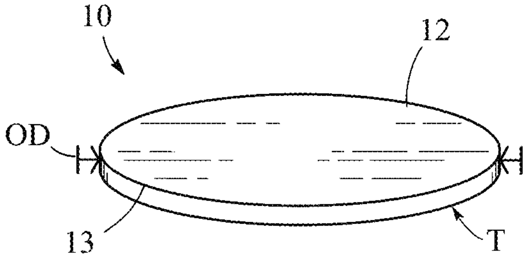
FIG. 1 is a perspective view of a first embodiment of a septum forming part of a bottle resealing kit according to the present invention.

FIG. 1 is a perspective view of a first embodiment of a septum that may be used in embodiments of a kit 100. The septum 10 is preferably a circular disk or diaphragm 12 made from a non-toxic and resiliently flexible material. Resiliently flexible, as used herein, is understood to mean the material possesses enough flexibility to be temporarily deformed, folded, or otherwise manipulated but resilient enough to spring back into its original shape, e.g., return to its circular shape or disk-like shape prior to deforming. In a preferred embodiment, the outer diameter OD of the septum 10 (or circular disk 12) is substantially equal to an inner diameter of a bottle being resealed by the septum 10. In preferred embodiments, the circular disk 12 is formed from a synthetic material, such as silicone rubber. In another embodiment, the circular disk 12 is made from a biodegradable material, such as certain types of synthetic polymers. Other elastomers or thermoplastics may also be used, such as foam rubber, thermoplastic rubber, natural rubber, nitrile, ethylene propylene, silicone, etc., so long as the material possesses the desired resilient and flexible characteristics, with sufficient rigidity to maintain the desired air-tight seal.

Figure 2:
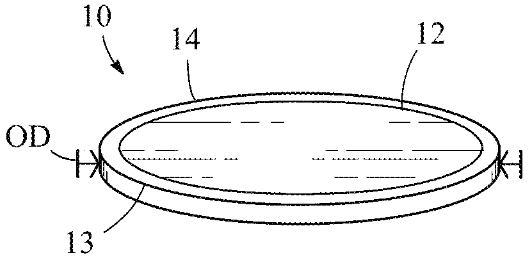
FIG. 2 is a perspective view of a second embodiment of a septum forming part of the bottle resealing kit according to the present invention.

FIG. 2 is a perspective view of an alternative embodiment of a septum 10 that may be used in embodiments of a kit 100. This septum 10 may include a flexible ring 14 engaged around the outer perimeter of the circular disk 12. The ring 14, like the circular disk 12, is resiliently flexible, but having a material composition that is more rigid than that of the circular disk 12. This feature adds stability to the perimeter of the septum 10 in its undeformed condition to provide a reliable friction-fit seal against the inner surface of the bottle, and promotes resilient reforming or restoration of the circular shape of disk 12 after temporary deformation during installation into a bottle. Preferably, the ring 14 is made from material identical to, or similar to, the material of the circular disk 12.

The outer diameter OD of the septum 10 in FIG. 2 includes the ring 14 and is preferably sized to be at least equal to the inner diameter of the bottle being resealed. In some embodiments, the ring 14 may be integrally molded with the circular disk 12. Alternatively, the ring 14 may be attached, e.g. by an adhesive, around the outer perimeter of the circular disk 12. The thickness of the ring 14 may be equal to, or unequal to, the thickness of the circular disk 12. In one embodiment, the ring 14 is slightly thicker than the circular disk 12. In another embodiment, the ring 14 is composed of material identical or similar to the material of the circular disk 12, but is made more dense to achieve a desired material characteristic, e.g. better resiliency, more rigidity, greater friction, additional weight, etc.

Figure 3:
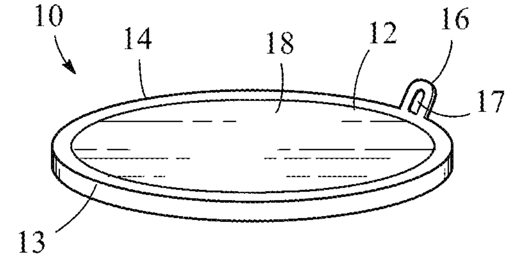
FIG. 3 is a perspective view of a third embodiment of a septum forming part of the bottle resealing kit according to the present invention.

FIG. 3 is a perspective view of a third embodiment of a septum 10 that may be used in embodiments of the kit 100. Here the septum 10 includes the ring 14 engaged about the outer perimeter of the circular disk 12 and defining the outer diameter OD of the septum 10. A tab 16 extends from the ring 14 to provide a grasping interface for a bodkin 20 to facilitate removal of the septum 10 from a bottle, as explained in more detail below. Preferably, the tab 16 is integrally formed with the ring 14 and extends vertically from the top side 18 of the septum 10. In one embodiment, tab 16 extends at an angle between about 45 and 90 degrees from horizontal, as shown. In another embodiment, the tab 16 comprises a loop defining a hole 17 configured to allow grasping engagement of the tab 16 by the bodkin 20.

Figure 9:
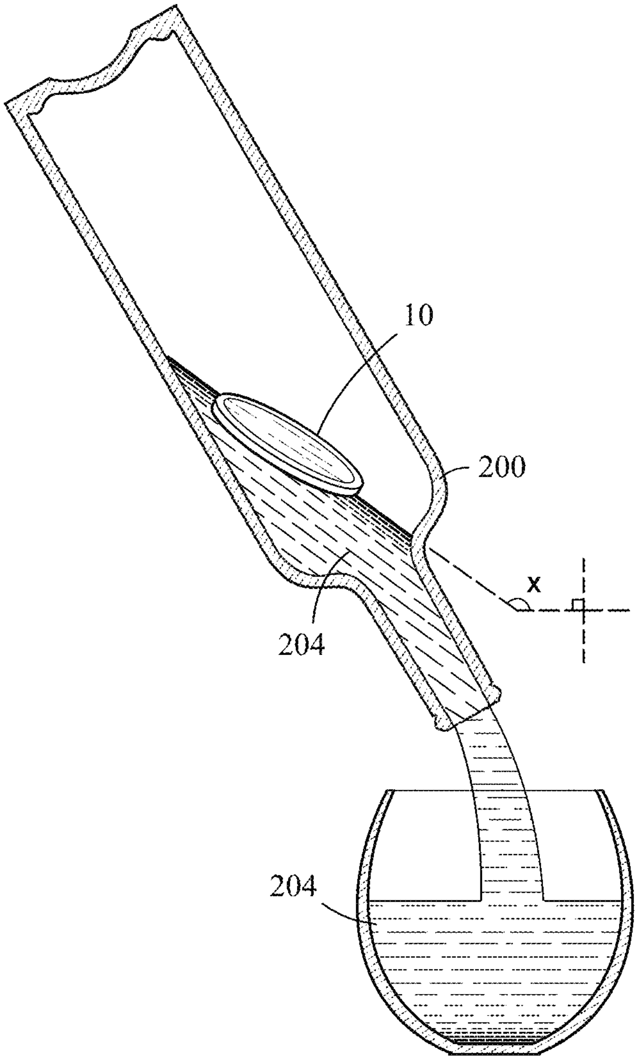
FIG. 9 is a side view of a bottle and glass illustrating a manner in which a seal formed by a septum within the bottle may be broken to allow outflow of liquid according to the present invention, the bottle and glass being shown in cross-section.
Figure 10:
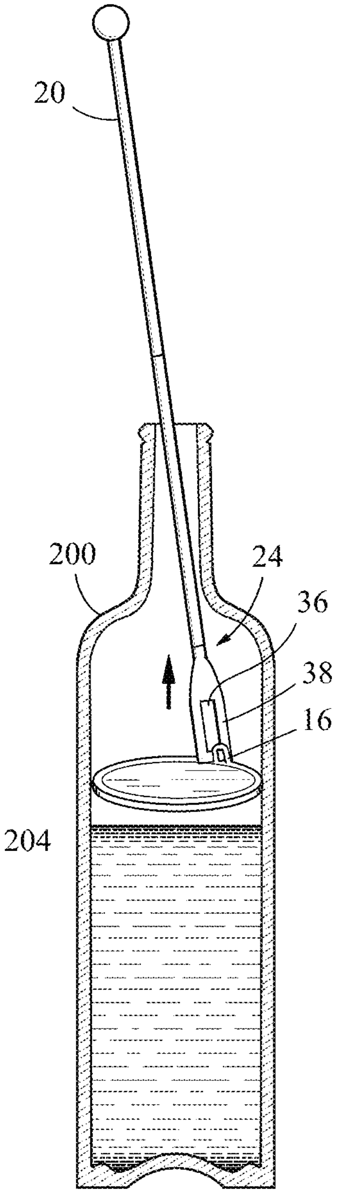
FIG. 10 is a side view illustrating an embodiment of a septum-and-bodkin kit in a state of use according to the invention illustrating a manner for removing the septum from a partially depleted bottle, the bottle being shown in cross-section.

In another embodiment, the septum 10 may be a consumable component of the resealing kit 100. That is, the septum 10 may be discarded after each use, whether or not it is removed after sealing a partially depleted bottle. The seal generated by the OD of septum 10 against the inner surface of the bottle can be broken by simply pouring the remaining liquid from the bottle against the septum 10 as it lay in a sealing position within the body. According to the invention, the septum 10 is designed such that the pouring force of liquid against the septum 10 will push the septum aside and create a flow path for the liquid to escape, as illustrated in FIG. 9. The septum 10 can be removed from the bottle by grasping it with a bodkin 20, as described in more detail below. A septum 10 removed from the bottle can be washed and later reused in another partially depleted bottle of the same size. A septum 10 can therefore also be a reusable component of the resealing kit 100.

Figure 4:
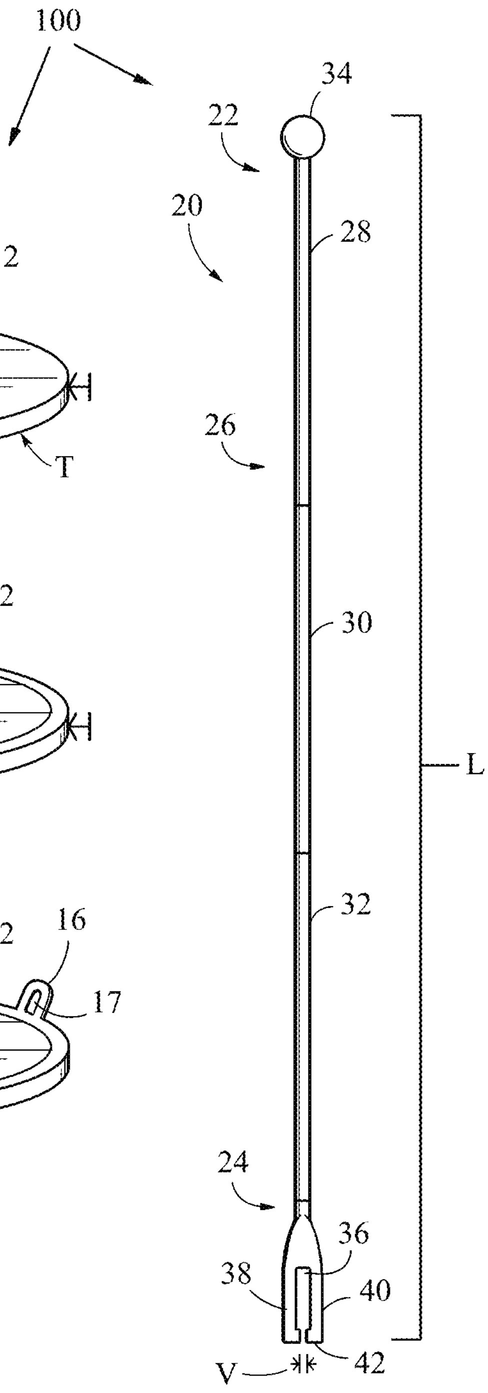
FIG. 4 is a side view of a first embodiment of a bodkin forming part of the bottle resealing kit according to the present invention.

FIG. 4 is a side view of an embodiment of a bodkin 20 that may be used in embodiments of the kit according to the invention. Generally, the bodkin 20 is an elongated tool that includes a rod 26, a first (or "ramming") end 22, and a second (or "retrieving") end 24 opposite the first end 22. The rod 26 may be subdivided into two or more coupleable pieces, for example, a first rod section 28, one or more intermediate rod sections 30, and a second rod section 32. Each of the coupleable rod sections 28, 30, 32 is removably attachable to at least one other removably coupleable rod section.

Figure 5:
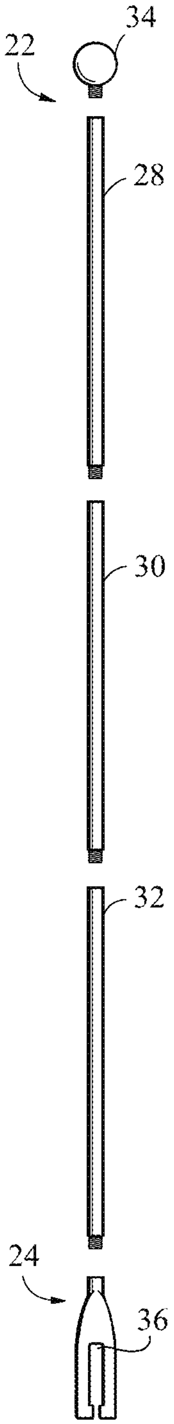
FIG. 5 is an exploded view of the bodkin of FIG. 4.
Figure 11:
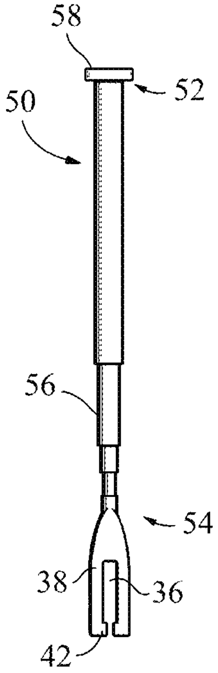
FIG. 11 is a side view of an alternative embodiment of a bodkin forming part of a septum-and-bodkin bottle resealing kit according to the present invention, the bodkin being shown in a stowed position.
Figure 12:
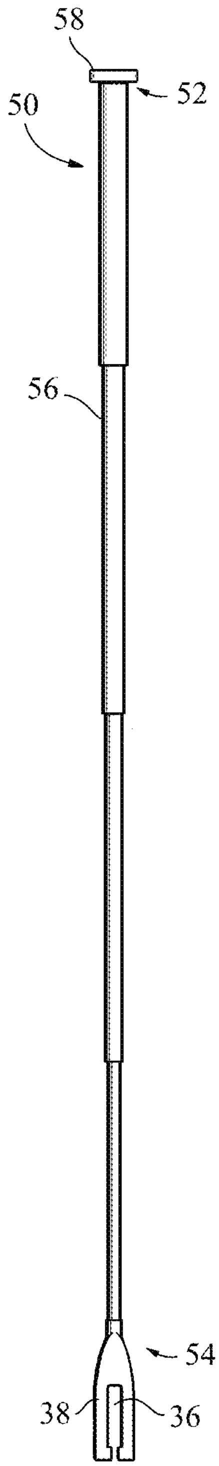
FIG. 12 is a side view of the embodiment of FIG. 11, the bodkin being shown in an expanded position.

FIG. 5 illustrates an embodiment of the bodkin 20 in exploded view, showing one configuration for coupling together sections of the bodkin 20, by forming threaded connections on an end of each segment 28, 30, and 32 of the bodkin. In an alternative embodiment, segments of the bodkin 20 may be coupled together in telescoping fashion, such as shown in FIGS. 11 and 12. Preferably, all parts of the bodkin are made non-corrosive rigid materials. Stainless steel is most preferred; however, any part of the bodkin may also be made from plated steel, brass, aluminum, wood, glass, ceramic, plastic, or thermoplastic rubber.

The maximum length L of the bodkin 20 when its segments are fully assembled or deployed will vary according to its intended usage. Preferably, if designed for use in resealing a wine bottle, the length L should be no greater than one-and-a-half times the full height of the bottle. In the case of a Standard sized wine bottle, as defined herein, the height of the bottle is nominally 12 inches; therefore, the length L of the bodkin 20 is preferably about 18 inches, but may vary from about 12 inches to about 18 inches. The length L of the bodkin 20 will increase for kits 100 designed for larger wine bottles, or decrease for smaller wine bottles. A "Standard" (with a capital S) size wine bottle is a particular one of a group of "standard" (with a lower case s) wine bottle sizes. A more complete list of the most common standard wine bottle sizes that are recognized in the wine industry are Split, Demi, Jennie, Standard, Magnum, Double Magnum, Jeroboam, Imperial, Salmanazar, Balthazar, Nebuchadnezzar, Melchior, Solomon, Goliath, and Midas. Approximate dimensions of many of these standard sizes are presented below in tabular form.

In preferred embodiments, the ramming end 22 of the bodkin 20 includes a rammer 34 configured to push the septum 10 through the neck opening of a bottle and position the septum within the bottle. The diameter of the rammer 34 is thus less than an internal diameter of the neck opening 201 for a given bottle 200. For example, the minimum neck diameter for the Standard wine bottle, as defined herein, is known to be about 0.728 inches or 18.5 millimeters. In embodiments of the kit designed for a Standard wine bottle, the diameter of the rammer 34 is therefore less than 0.728 inches, e.g., the diameter of the rammer 34 may be about 0.5 inches. The ramming end 22 may be removably attachable to a coupleable rod section 28, 30, or 32, as shown.

The ramming end 22 or rammer 34 is preferably configured as having a blunt end, that will assist in forcing the septum 10 through the bottle neck without piercing or perforating the septum, and assist in final positioning of the septum to create an air-tight seal. The rammer 34 may therefore be formed in a variety of different shapes. In some embodiments, the rammer 34 may be designed as a ball or a sphere removably attachable to the first rod section 28. In alternative embodiments, the rammer 34 may be formed into any of various shapes such as a cube, a cylinder, a cone, a pyramid, and an ovoid. In one preferred embodiment, the rammer 34 is formed as a disk as shown in FIGS. 11 and 12. In another embodiment, the rammer 34 may include an angled section that extends from the first end of the bodkin at an acute angle with respect to the axis of the rod 26.

The retrieving end 24 of the bodkin 20 is configured to engage the septum 10 for removal from the bottle 200. For this purpose, the retrieving end 24 of the bodkin 20 may be specially formed as a septum-grasping end capable of mechanically engaging a septum 10 and capable of being coupled to a second rod section 32. In one embodiment, the septum-grasping end 24 is formed as a single hook, similar to a fish hook, and may have a sharpened point or be barbed or barbless. The single-hook embodiment is configured to allow the hooked end to snag the septum, by the sharpened point piercing a surface of the septum if necessary, to facilitate removal of the septum by manually withdrawing it from the bottle.

In another embodiment, the septum-grasping end 24 is formed as two opposing hooks 38 surrounding an open eyelet 36. Each hook 38 may include a tine 40 and a barb 42, as shown. A gap or void V is defined between opposing barbs 42. In one embodiment, the gap V is slightly greater than the thickness T of the septum 10, to allow a user handling the bodkin 20 to snag the septum 10 by grabbing an edge of the septum between the barbs 42. The septum may then be removed from the bottle by withdrawing the bodkin, using a slight twisting motion if necessary to allow the barbs 42 to snag the sides of the septum. In embodiments where the septum 10 includes a tab 16, one hook 38 of the open eyelet 36 may engage or hook the hole 17, or the tab 16 directly, to allow for withdrawal of the septum 10 from the bottle. The term "open eyelet" as used herein denotes, generally, a hole defined within a ring of material that is not entirely surrounded by the ring; i.e. there exists a gap in the ring, such as the gap V formed through the perimeter of the ring between the tines 38 that leads to the eyelet 36. The retrieving end 24 may be removably attachable to a coupleable rod section 28, 30, or 32, as shown.

In another embodiment, a string, thread, or thin cable, such as fishing line or standard electrical wire (e.g. #12 or #14 gauge) may be affixed to the grasping end of the bodkin, and a hook as described above may be tied or otherwise affixed to the opposite end of the line in a configuration resembling fishing line attached to a fishing rod. The line, being more flexible that the bodkin itself and having variable length customizable by a user, can facilitate snagging and removal of the septum from a wide range of bottle shapes and sizes. In another embodiment, the bodkin may be formed from a material commonly used to manufacture fishing rods, such as graphite or fiberglass or plastic, and may be resiliently flexible. In this latter embodiment, a snagging device such as a hook, ferrule, or eyelet may be affixed to the distal end of the bodkin to facilitate grasping and removal of the septum.

Figure 6:
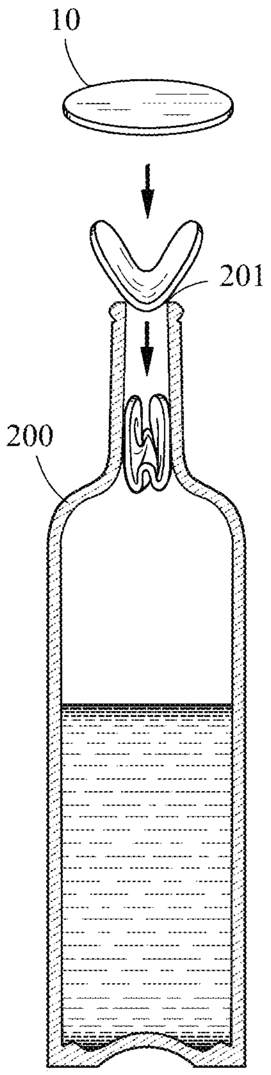
FIG. 6 is a side view illustrating advancing stages of a septum according to the invention being inserted into a partially depleted bottle, the bottle being shown in cross-section.

FIGS. 6 through 10 illustrate the various steps for deploying the kit 100 for resealing a partially depleted bottle, such as an opened bottle of wine. In particular, FIG. 6 is a perspective view showing the septum being pushed into a partially depleted bottle, the bottle being shown in cross-section for illustration purposes. The septum 10 is initially aligned over the neck opening 201 of the bottle 200. A user may roll, fold, or otherwise deform the septum 10 to prepare the septum for insertion into the neck opening 201, or otherwise deform the septum 10 during the act of pressing the septum into and through the neck opening. The flexibility of the septum 10 allows the user to easily perform this step.

Figure 7:
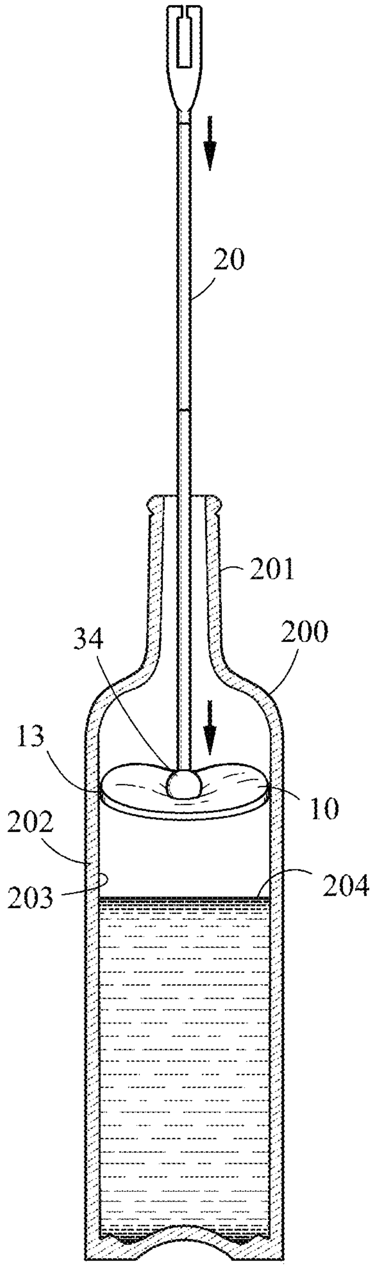
FIG. 7 is a side view illustrating an embodiment of a septum-and-bodkin kit in a state of use according to the invention in which the bodkin positions the septum within a partially depleted bottle, the bottle being shown in cross-section.

FIG. 7 is a perspective view of an embodiment of the septum 10 being pushed into a partially depleted bottle using a bodkin 20 after passing the septum through the neck opening 201. Again, the bottle 200 is shown in cross-section for illustration only. To force the deformed septum 10 through the neck opening 201, a user pushes the septum deeper into the bottle using the rammer 34 on the first end 22 of the bodkin. The resiliency of the material forming the septum 10 causes the septum 10 to return to its original shape, e.g., to a circular disk, once it is pushed past the neck opening 201 and into the body 202 of the wine bottle 200. As the septum 10 restores itself to original form, the perimeter 13 engages the inner surface 203 of the wine bottle 200. The user may then continue to press the septum 10 further into the bottle using the ramming end of the bodkin 20, and make fine adjustments to the placement of the septum 10 with respect to the surface of contained liquid 204. In particular, the rammer 34 can be used to press the septum 10 into a resting place upon the surface 205 of the liquid 204 to seal the liquid 204 against air that intrudes into the bottle above the septum. Preferably, a user presses the septum 10 into a final position directly above the surface 205, leaving as little free space as possible between the top surface of the liquid and the bottom surface of the septum, and thereby evacuates the air from that space while pressing the septum into its final position. The final position may be on or slightly below the surface of the liquid, and may allow a negligible amount of leakage of the liquid above the septum. The septum 10 thus creates an air-tight seal between the perimeter 13 of the septum 10 and the inner surface 203 of the wine bottle 200.

Figure 8:
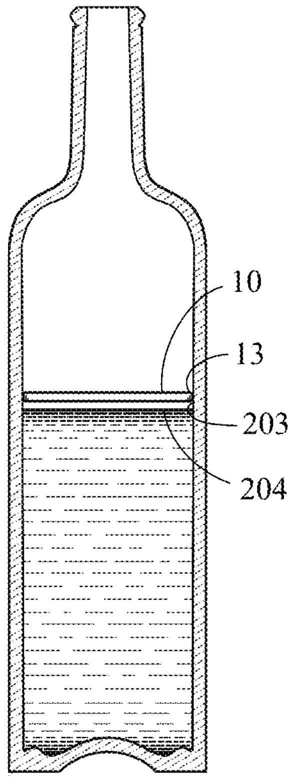
FIG. 8 is a cross-sectional view of a partially depleted bottle having been resealed using the septum-and-bodkin kit according to the present invention.

FIG. 8 is a cross-sectional view of an embodiment of the septum shown in a final or near-final position within a partially depleted wine bottle to create the air-tight seal therein. The air-tight seal created between the septum 10 and the inner surface 203 of the wine bottle 200 is maintained so long as the bottle is positioned substantially upright, as shown in the figure. Preferably the septum 10, though flexible, is formed from material that is sufficiently rigid to maintain the air-tight seal through rotation of the bottle some number of degrees off of horizontal. For example, in one embodiment, the septum 10 is configured to maintain the air-tight seal when the bottle is half full of water and rotated between 0 and 90 degrees from horizontal up to a speed of about 10 degrees per second, i.e. within a normal range of the speed of rotation of a human hand. In other embodiments, under the same conditions, the septum 10 may be configured to maintain the air-tight seal up to 90 degrees of rotation, and to release the air-tight seal at any angle of rotation greater than 90 degrees.

Alternatively, the construction of the septum 10 may be specified in terms of a performance rating. For example, under initial conditions of: (i) a bottle half full of water, (ii) the septum lying horizontal on the surface of the water, (iii) the septum forming an air-tight seal against the inner surface of the bottle, and (iv) the bottle in an upright position; when (iv) the bottle is then rotated in a pouring motion at a speed of 10 degrees per second, the septum breaks its seal to allow water to flow past the septum when the bottle is rotated to an angle of X degrees. At that point, and under those conditions, the angle X is called the “breakage angle” and a numerical value of the breakage angle, e.g. in degrees rotated from horizontal, is the “breakage angle rating”. The breakage angle rating may be determined experimentally using known statistical methods, such as by computing the statistical mean of a sampling of measured breakage angles of septa constructed and installed according to the teachings herein. Preferred embodiments of the invention may include a septum constructed to achieve a breakage angle rating of anywhere between about 90 degrees and about 180 degrees. In one preferred embodiment, the invention is characterized by a septum constructed to achieve a breakage angle rating of about 135 degrees.

Ideally, the air-tight seal between the septum 10 and the inner surface 203 of the wine bottle 200 may be broken by simply pouring the liquid from the bottle using a normal human pouring motion, such that the hydrostatic pressure of the liquid overcomes the frictional force that maintains the seal. Alternatively, prior to pouring out the liquid, a user may break the air-tight seal of the septum by prodding the septum with the ramming end of the bodkin.

FIG. 9 is a side view of a bottle and glass illustrating a manner in which an air-tight seal formed by a septum within the bottle may be broken to allow outflow of liquid according to the present invention. The bottle and glass are shown in cross-section for purposes of illustration only. At or beyond the breakage angle X, the force of the liquid 204 being poured from the wine bottle 200 is sufficient to overcome the frictional engagement of the perimeter 13 of the septum 10 with the inner surface 203 of the wine bottle 200. The septum 10 remains in the wine bottle 200 and may be discarded when the bottle is empty.

In more elaborate embodiments of the kit 100, the septum 10 includes the ring 14 with the tab 16 extending therefrom. The ring 14 provides more friction between the perimeter 13 and the inner surface 203 of the wine bottle 200 than does the perimeter of a septum not having the ring 14, due to a difference in the material selected for the ring, e.g., a synthetic rubber, or due to the thickness or density of the ring 14. In one embodiment, the friction generated between the perimeter 13 of the ring 14 and inner surface 203 of the wine bottle 200 may be sufficient to hold the liquid 204 within the bottle, even when inverting the bottle to attempt to pour the liquid out, i.e., the angle X equals 180 degrees with no breakage of the seal. To remove the septum 10 in such embodiments, a user may insert the second end 24 of the bodkin 20 into the wine bottle 200. At the retrieving end 24, the hooks 38 are designed to engage the septum 10 for removal. One of the two hooks 38 may be used to engage the loop 16, as shown, so that the bodkin 20 may then be used to manually withdraw the septum 10 out of the wine bottle 200. Alternatively, the open eyelet 36 and tines 40 may be used to engage the thickness T of the septum 10 by positioning an edge of the septum in the gap V created between the opposing hooks 38. The septum 10 may thereafter be removed from the wine bottle 200 by simply withdrawing the bodkin 20 through the neck opening 201, and slightly twisting the bodkin during removal if necessary to cause barbs 42 to bite into the top and bottom surfaces of the septum 10. The septum 10 may be washed and reused with the next partially depleted bottle.

FIG. 11 is a side view of an alternative embodiment of a bodkin that may be used in the kit 100. In this embodiment, the bodkin may be referred to as a telescoping bodkin 50. The telescoping bodkin 50 in this view is shown in a retracted condition which provides for easy storage of the kit 100 when not in use. The telescoping bodkin 50 includes a first end 52 and a second end 54 connected by a telescoping rod 56. The first end 52 is similar to the first end 22, described above, and includes a rammer 58. In the illustrated embodiment, the rammer 58 is formed as a disk. The rammer 58 is configured to engage the septum 10 to position the septum within a partially depleted bottle, as previously described. The second end 54 is constructed similarly to the second end 24 and includes the open eyelet 36 having two opposing hooks 38, with or without barbs 42. The hooks 38 are separated by a gap V, as previously described.

FIG. 12 is a side view of the telescoping bodkin 50 shown in an expanded position. The telescoping feature of the bodkin 50 allows the bodkin to be adjusted to different working lengths according to need. For example, the telescoping rod 56 can be lengthened for use with a variety of wine bottle sizes to achieve an optimal length for a particular bottle, without the need for connecting or disconnecting intermediate sections 30.

As described herein, the kit 100 is useful in resealing a partially depleted bottle of liquid. In particular, the kit 100 is specifically designed to be used with partially depleted wine bottles, which are known to come in a variety of standardized sizes. That is, each standard wine bottle size has standard dimensions that are known in the art. Common commercially available wine bottles, listed in order of increasing size, are shown in the table below.

EXAMPLES OF STANDARD WINE BOTTLE SIZES

| NAME | HEIGHT | BODY DIA. | VOLUME |
|---|---|---|---|
| Split | 7.5 in. | 2.375 to 2.5 in. | 187.5 mL |
| Demi | 9.5 in. | 2.25 to 2.375 in. | 375 mL |
| Standard | 11.5 to 13 in. | 2.875 to 3.5 in. | 750 mL |
| Magnum | 14 in. | 4.0 to 4.5 in. | 1.5 L |
| Jeroboam | 18 in. | 5.0 in. | 3.0 L |
| Imperial | 19.5 to 22 in. | 5.0 in. | 6.0 L |
| Salmanzar | 24.0 in. | 7.5 in. | 9.0 L |
| Balthazar | 28.0 in. | 8.0 in. | 12.0 L |
| Nebuchadnezzar | 31.0 in. | 8.5 in. | 15.0 L |
| Melchior | 36.0 in. | 9.0 in. | 18.0 L |

The utility of the claimed invention can therefore be appreciated by the skilled artisan when a kit 100 according to the invention is specified for use with any one or with any group of the standardized wine bottle sizes. Accordingly, a bodkin 50 may be extendable to match the height of any one of many standard bottle sizes, and septa 10 of one or more different diameters may be included in the kit to match the same set of standard-sized bottles. While precise dimensions of the inner diameter of the body portion of a wine bottle may vary for the same standard size of bottle, due to manufacturing tolerances or to variation among specifications established by different bottle makers, a septum according to the invention can tolerate such minor variations by specifying that its diameter for a standard bottle size meet or slightly exceed the maximum expected inner diameter among all such standard sizes that are most commonly distributed in commerce. The septum 10 is thus formed to tolerate such variations by its ability to flex slightly in an upward arc, or to be pushed by the bodkin 20 into a slight concave curvature against the surface of contained liquid, along the perimeter of the inner diameter of the bottle, to create and maintain the desired air-tight seal.

Formation of a septum 10 may be accomplished in many ways using experience from known manufacturing methods. These ways include stamping septa from a sheet of material using a circular stamping blade, slicing septa from a cylindrical block, e.g. with the block in a hardened condition of during extrusion of the block, molding septa using an injection molding process, or forming septa using a three-dimensional printing technique. Formation of the bodkin 20 may be accomplished by known metalworking methods such as forging, extruding, machining, bending, cutting, crimping, and stamping.

Septa 10 formed to operate in accordance with the aforesaid principles of the invention may provide additional functions. In one example, a septum 10 can be alternatively used as a coaster for wine glasses or for any other appropriately sized beverage container. In another example, a septum 10 is manufactured with a surface—either the top surface, bottom surface, or both—suitable for printing information and artwork. Preferably, such a surface would be substantially smooth and able to hold and display ink. Foam rubbers, such as those made of synthetic rubbers, polyethylene, or organic latex may be suitable for this purpose.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A kit for resealing liquid within a bottle having a neck and a body, the kit comprising:

a resilient deformable septum having an undeformed dimension substantially equal to an inner diameter of the body, the septum deformable to a deformed dimension less than an inner diameter of the neck; and a bodkin having a ramming end configured to deform and push the septum through the neck, and having opposite the ramming end a retrieving end configured to grasp and extrude the septum from the neck.

2. The kit of claim 1, wherein the septum undeformed is configured to form an air-tight seal with the inner diameter of the body.

3. The kit of claim 2, wherein the air-tight seal formed by the septum is maintained when the bottle is inverted 180 degrees.

4. The kit of claim 1, wherein the septum has a breakage angle less than 180 degrees.

5. The kit of claim 1, wherein the septum further comprises a circular disk having a perimeter comprising a flexible ring having greater rigidity than the circular disk.

6. The kit of claim 1, wherein the retrieving end of the bodkin is configured to engage an edge of the septum.

7. The kit of claim 1, wherein the ramming end of the bodkin comprises a rammer having a width less than the inner diameter of the neck.

8. The kit of claim 7, wherein the rammer comprises a sphere.

9. The kit of claim 1, wherein the receiving end comprises a pair of opposing hooks.

10. The kit of claim 9, wherein the opposing hooks are separated by a gap having a width greater than a thickness of the septum.

11. The kit of claim 9, wherein at least one of the opposing hooks comprises a barb.

12. The kit of claim 1, wherein the bodkin comprises a rod having multiple coupleable sections.

13. The kit of claim 12, wherein one or both of the ramming end and the receiving end is removably attachable to one of the coupleable sections.

14. The kit of claim 1, wherein the bodkin is formed from stainless steel.

15. The kit of claim 1, wherein the bodkin telescopes in length.

16. The kit of claim 1, wherein the outer diameter of the septum is substantially equal to an inner diameter of a wine bottle, the wine bottle having a standard size selected from the group consisting of Split, Demi, Jennie, Standard, Magnum, Double Magnum, Jeroboam, Imperial, Salmanazar, Balthazar, Nebuchadnezzar, Melchior, Solomon, Goliath, and Midas.

17. The kit of claim 1, wherein the bodkin is extendable to a length at least one-and-a-half-times the height of a wine bottle, the wine bottle having a standard size selected from the group consisting of Split, Demi, Jennie, Standard, Magnum, Double Magnum, Jeroboam, Imperial, Salmanazar, Balthazar, Nebuchadnezzar, Melchior, Solomon, Goliath, and Midas.

18. The kit of claim 1, wherein the septum comprises biodegradable material.

19. The kit of claim 1, wherein the septum comprises foam rubber.

* * * * *